United States Patent Office 3,414,654
Patented Dec. 3, 1968

3,414,654
METHOD FOR COMBATING BACTERIA IN VAPOR PHASE WITH 1,1,3-TRICHLOROTRIFLUOROACETONE
Cyril Woolf, Morristown, N.J., assignor to Allied Chemical Corporation, New York, N.Y., a corporation of New York
No Drawing. Filed June 21, 1966, Ser. No. 559,064
3 Claims. (Cl. 424—331)

This invention relates to a method for combating bacteria by treatment with a chemical agent in vapor phase.

The problem of combating bacteria, meaning in the context of this discussion killing and preventing or retarding the propagation of bacteria, is common to a number of industries, and is particularly significant to the medical profession. The usual methods of sterilization such as steam, heat, chemical solution, radiation, and the like, are impractical when large areas such as hospital rooms, laboratories and animal quarters are desired to be sterilized or when it is desired to sterilize delicate laboratory and medical equipment, which may contain plastics, fabrics, and the like that may be adversely affected by moisture and heat.

The term sterilization, in the context of this discussion, will be interpreted as referring to a condition in which a body or locus is freed from all living bacteria.

The problem of freeing a body from all living bacteria is no mean one because, although many varieties of bacteria are relatively easy to combat, others have particularly high resistances to adverse conditions and are exceedingly difficult to combat. Such a bacteria is the species *Staphylococcus aureus*. Unfortunately, *Staphylococcus aureus* bacteria are commonly found in hospitals and food and are responsible for a large number of human fatalities every year. Because *Staphylococcus aureus* cells are so difficult to combat in comparison with other bacteria cells, researchers have used these cells as standards of sterilization tests. It is presumed that if a given chemical agent is effective in combating *Staphylococcus aureus* cells it will be effective in combating other varieties of vegetative bacteria cells. The converse of this is not true. Experience has proved this to be the case. An illustrative standard test that is widely used is the so-called F.D.A. Method (Food and Drug Administration Method) as published by Ruehle and Brewer in 1931. (See Porter, Bacterial Chemistry and Physiology, John Wiley & Sons, Inc., N.Y. (1946), p. 226.) This method requires tests of disinfectant or antiseptic action to be carried out against bacteria strains of *Staphylococcus aureus*.

Spore forms of bacteria are notoriously difficult to combat, as compared with vegetative cell forms, in view of the additional protective layers which they possess, which layers must be penetrated in order to achieve bactericidal action. *Bacillus globigii* spores are the hardiest of the bacteria spore forms known and it is generally accepted that if a given chemical agent is effective in combating such spores, it will be effective in combating other varieties of spore bacteria.

In the specification and claims, the term bacteria will be taken generically to denote both vegetative cell and spore forms of bacteria.

The problem of sterilizing large areas and of sterilizing heat- or water-sensitive materials has been alleviated by the use of bactericidal agents in vapor phase. Effective vapor phase bactericidal agents must be capable of being readily introduced into the vicinity of the area to be treated; of rapidly and thoroughly penetrating porous surfaces in the area; of effectively penetrating the bacteria to be treated; of destroying the bacteria at normal temperatures and humidities; and of permitting ready removal by aeration. Unfortunately, many chemical agents, while possessing good bactericidal activity, are not capable of functioning effectively in vapor phase for lack of one or more of the above-noted requirements.

Bactericidal agents, for example, which have high vapor pressures and may be vaporized easily, may still not possess the penetrability properties required for effective vapor phase use. The property of high penetrability in vapor phase is essential in order that the desired bactericidal effects be achieved quickly and thoroughly.

The ability to sterilize quickly and thoroughly is particularly significant, for example, when it is desired to achieve temporary sterile conditions, for medical purposes, in combat zones and under battlefield conditions. In such circumstances, time is of the essence, and it may not be feasible to wait for an extended period of time in order to achieve sterile conditions. Under such circumstances the ability of a bactericide to function effectively under a wide variety of weather conditions, such as relative humidity, is also significant; since the battlefield may range from the jungle to the arctic.

It is a major object of this invention to provide a novel method for combating bacteria.

Another object of the invention is to provide a novel sterilization method.

It is a particular object of the invention to provide a novel method for combating bacteria by treatment with a chemical agent in vapor phase.

Another specific object of the invention is to provide a method for effectively combating bacteria by treatment with a chemical agent in vapor phase, over a wide range of relative humidity conditions.

The preferred object of the invention is to provide a means for effectively combating *Staphylococcus aureus* and/or *Bacillus globigii* bacteria by treatment with a chemical agent in vapor phase, over a wide range of relative humidity conditions.

It has been found that the above stated objects of the invention are accomplished by treating the bacteria with 1,1,3-trichlorotrifluoroacetone, hereinafter referred to as "the subject acetone."

Certain other perhalogenated acetones are known to possess various types of chemotherapeutic properties such as fungicidal. There has been, however, no previous disclosure which would have made it possible for one to predict the significantly high penetrability properties possessed by the subject acetone in vapor phase and its consequent high effectiveness against both cell and spore forms of bacteria, in terms of quick and effective kill over a wide range of relative humidity conditions. In fact, surprisingly, the subject acetone has been found to be significantly more effective as a vapor phase bactericide than the closely related perhalogenated acetone species 1,1,3,3-tetrachlorodifluoroacetone and 1,3-dichlorotetrafluoroacetone. It will be noted that the latter perhalogenated acetone species differ from the subject species only in that they contain one more or less fluorine atom in the molecule. Comparative data are provided in the examples.

The subject acetone is a known compound and is a colorless liquid under normal conditions having a boiling point of 84.2° C. The compound is commercially available, but may be prepared by reacting hexachloroacetone with HF in the presence of an antimony pentahalide at temperatures from about 30–200° C. This procedure is described in more detail in U.S.P. 2,853,524 to C. B. Miller et al.

The subject acetone may be used alone to treat bacteria or bacteria-containing surfaces, or it may be used in combination with a vaporous diluent such as air. When used alone, the subject acetone may be allowed to evaporate or vaporize at room temperature in a closed area containing the bacteria or bacteria-containing surfaces, or it may be subjected to the influence of heat in order to accelerate the vaporization procedure. Another convenient way in which it may be used is by bubbling a vaporous diluent, e.g. air, into the liquid acetone and then using the acetone-laden air to fumigate a closed space containing the bacteria-containing surfaces to be treated. Other modes of utilizing the subject acetone in vapor state may be devised and the above described methods are not intended as constituting any limitation of the invention.

As is well known in this art, dosages of a given bactericidal agent can vary widely depending upon the particular organism to be controlled, the area of the locus to be treated, the time in which control is desired to be established, and environmental conditions such as temperature, relative humidity, etc. In any event, a sufficient concentration of the subject acetone should be utilized in order to effectively combat the bacteria to be treated, that is to say, in order to maximize the killing of existing living bacteria and also the prevention of propagation of the same in the same locus for a significant period of time. The dosages that will be required in a particular case to accomplish these ends are readily ascertainable and are thus within the skill of the art.

The subject acetone can be employed as the sole active ingredient in combating bacteria; however, if desired, it can be combined with active materials such as other bactericidal agents or growth inhibitors to achieve special results, or with nonactive components such as perfumes, propellant aids, and the like.

The following examples demonstrate the bactericidal activity of the subject acetone in vapor phase and comparative bactericidal activity of other halogenated acetones.

Examples 1–6 show results obtained against *Staphylococcus aureus* cells. Examples 7–12 show results obtained against *Bacillus globigii*.

Examples 1–6

One-tenth ml. portions of perhaloacetone test materials were charged to one-liter flasks. Circular patches of cotton cloth, each having an area of about 2 cm.² and each impregnated with an aqueous suspension of about 5×10⁶ *Staphylococcus aureus* cells and subsequently dried, were suspended by wires about half-way down into the flasks. The flasks were stoppered and the patches containing the bacteria were exposed to the subject acetone vapor for periods of 1, 4 and 24 hours. The exposures were conducted at room temperature (about 20–31° C.) and were duplicated in atmospheres of 50% and 90% relative humidity. Relative humidities in the bottles were elevated by flushing with air passed through water. At the end of the exposure periods, the patches were removed and assayed for viable organisms by the pour-plate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monooleate) v./v. and adjusted to pH 7 with 1 N NaOH. Organisms remaining on the patches were dislodged by shaking and aliquots were plated in enriched nutrient agar. After incubating for 48 hours at 37° C., the percentage of organisms killed (attributable to the action of the subject acetone test material) was calculated by comparison of the number found after testing with an assay of unexposed contaminant patches. Bacteria counts were made with a Quebec Colony counter. Average results of the above described tests are shown in the following table:

TABLE I

| Ex. | Test compound | Relative humidity | Percent of bacteria cells killed | | |
|---|---|---|---|---|---|
| | | | 1 hr. | 4 hrs. | 24 hrs. |
| 1 | 1,1,3-trichlorotrifluoroacetone | 50 | 100 | | |
| 2 | do | 90 | 100 | | |
| 3 | 1,1,3,3-tetrachlorodifluoroacetone | 50 | 0 | 0 | 0 |
| 4 | do | 90 | 15.3 | 78.6 | 100 |
| 5 | 1,3-dichlorotetrafluoroacetone | 50 | 99.9 | 99.9 | 100 |
| 6 | do | 90 | 96.7 | 99.2 | 100 |

It can be seen from the above table that the subject acetone of Examples 1 and 2 effects complete sterilization, i.e., 100% kill, both at high and low relative humidities in as short a period as 1 hour; whereas, with the other test compounds, complete sterilization, if obtained at all, is not achieved until after at least 24 hours exposure. Moreover, with the other test compounds, the extent of sterilization varies significantly with the relative humidity. The test compound closest in activity was 1,3-dichlorotetrafluoroacetone which, as will be noted, lost a significant part of its effectiveness under conditions of high relative humidity.

Examples 7–12

The test procedure of Examples 1–6 was followed using *Bacillus globigii* spores as the test bacteria. The results are reported in Table II.

TABLE II

| Ex. | Test compound | Relative humidity | Percent of spores killed | | |
|---|---|---|---|---|---|
| | | | 1 hr. | 4 hrs. | 24 hrs. |
| 7 | 1,1,3-trichlorotrifluoroacetone | 50 | 89.3 | 100 | |
| 8 | do | 90 | 98.0 | 100 | |
| 9 | 1,1,3,3-tetrachlorodifluoroacetone | 50 | 0 | 0 | 0 |
| 10 | do | 90 | 0 | 32.1 | |
| 11 | 1,3-dichlorotetrafluoroacetone | 50 | 74.1 | 88.0 | 100 |
| 12 | do | 90 | 55.9 | 95.3 | 99.3 |

It will be seen from the above data that the subject acetone of Examples 7 and 8 exhibits comparatively significantly high activity as compared with the other test compounds. 100% kill of the highly resistant spores was obtained at the end of 4 hours exposure at both 90% and 50% relative humidity; whereas, in the case of the next most active test compound, equivalent kill was not obtained even after 24 hours at 90% relative humidity and only after 24 hours at 50% relative humidity. These data show that complete sterilization (100% kill) against bacterial spores is obtainable with the subject acetone much more quickly than is possible with equivalent concentrations of the other halogenated acetones tested.

I claim:

1. The method for combating bacteria which comprises treating bacteria with a bactericidally effective amount of 1,1,3-trichlorotrifluoroacetone in vapor phase.

2. The method of claim 1 in which the bacteria are *Staphylococcus aureus* cells.

3. The method of claim 1 in which the bacteria are *Bacillus globigii* spores.

References Cited

UNITED STATES PATENTS 2,970,173   1/1961   Howard et al. _____ 167—22 X
3,351,665   11/1967   Gilbert et al. _____ 167—22 X ALBERT T. MEYERS, *Primary Examiner.*

D. R. MAHANAND, *Assistant Examiner.*